Figure 9:
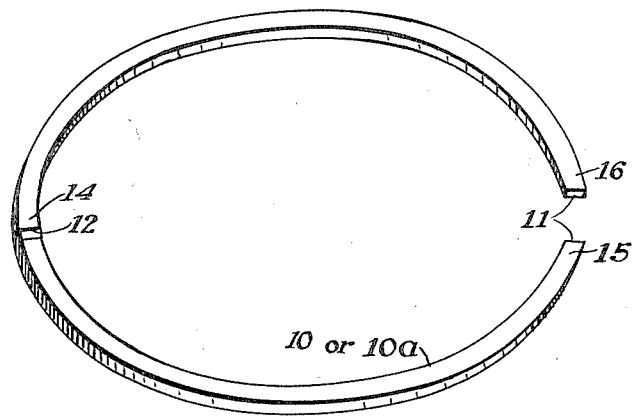

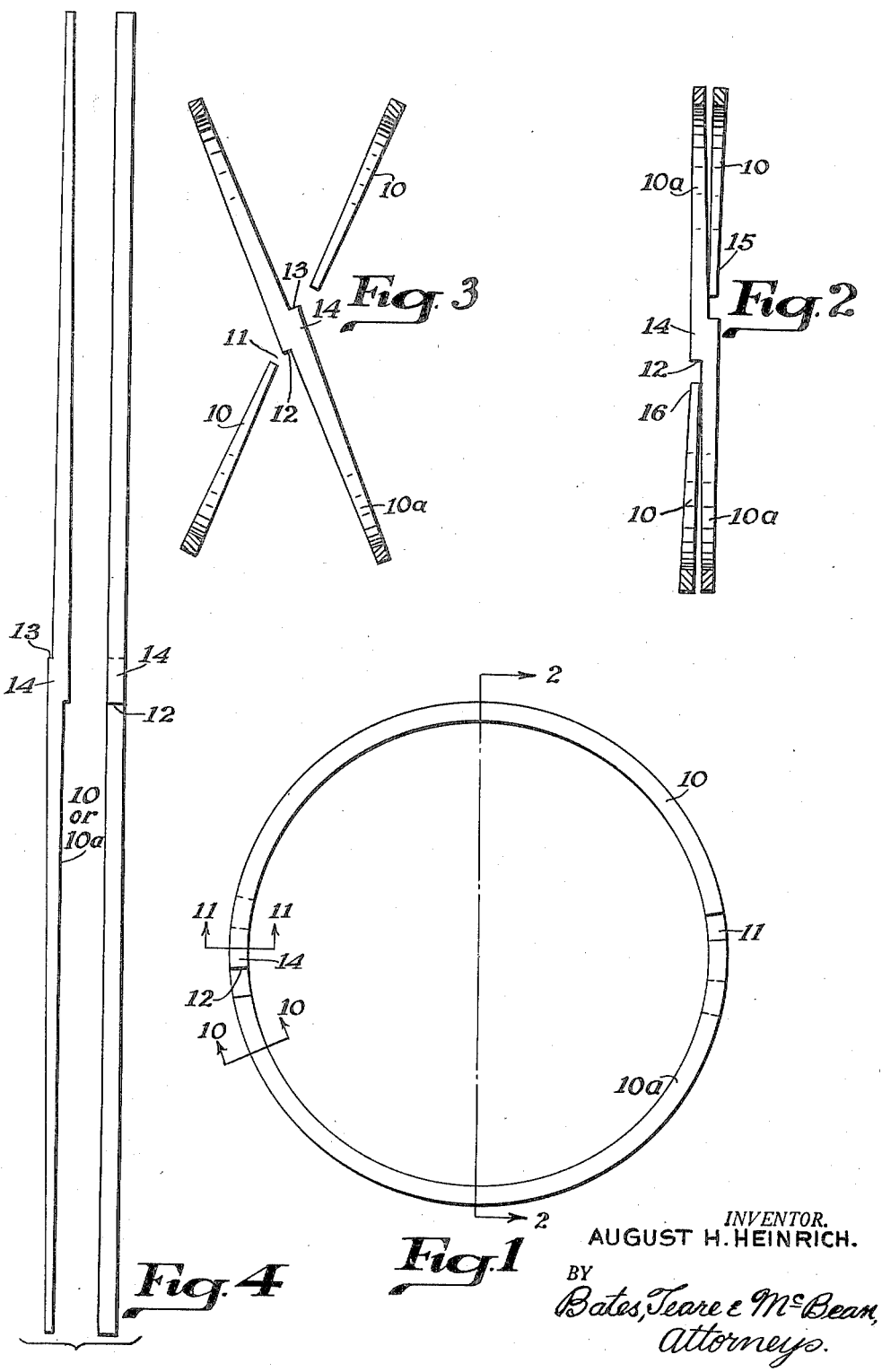

Jan. 31, 1950     A. H. HEINRICH     2,496,048
PISTON RING
Filed Oct. 11, 1945     3 Sheets-Sheet 2
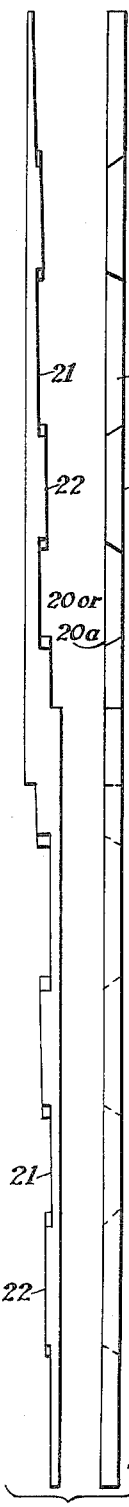
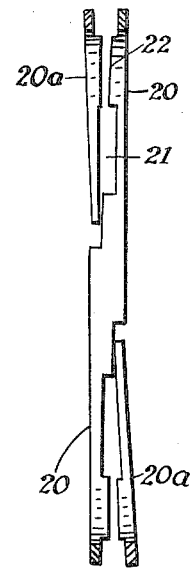
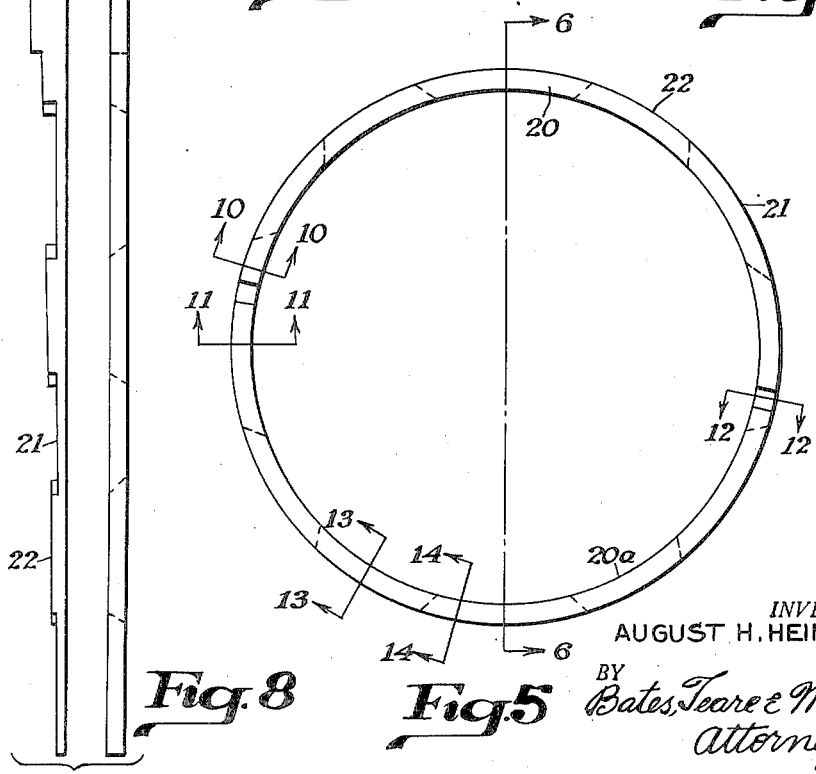
INVENTOR.
AUGUST H. HEINRICH.
BY Bates, Teare & McBean,
Attorneys.

Jan. 31, 1950

A. H. HEINRICH 2,496,048

PISTON RING

Filed Oct. 11, 1945

3 Sheets-Sheet 3

INVENTOR.
AUGUST H. HEINRICH.

BY Bates, Teare & McBean,
Attorneys.

Patented Jan. 31, 1950

2,496,048

UNITED STATES PATENT OFFICE 2,496,048

PISTON RING

August H. Heinrich, Euclid, Ohio, assignor to Auto-Diesel Piston Ring Company, Cleveland, Ohio, a corporation of Ohio Application October 11, 1945, Serial No. 621,787

13 Claims. (Cl. 309—44)

This invention relates to a two-part piston ring, the general object being to provide a ring which will maintain a substantially fluid-tight connection between the piston and cylinder wall notwithstanding wear in use. More specifically it is an object of the invention to provide a two-part ring which will be automatically expanded in a direction lengthwise of the piston as the right mounted in the piston groove is placed in the cylinder, thus causing a snug engagement with the upper and lower walls of the groove, preventing looseness or chattering of the ring in operation. Another feature of my invention is the provision of a two-part ring made of two identical parts, which simplifies the manufacture of the ring.

My piston ring is adapted for carrying oil within itself if desired, and a modification which will enable its action as an oil ring while retaining its expanding features mentioned, is also included in my invention.

My invention is illustrated in the drawings hereof both as a piston ring for stopping the passage of gaseous fluid and as a ring adapted also to entrap oil for lubricating the cylinder wall, and the invention will be further explained in connection with the detailed description of such showing.

Figure 10:
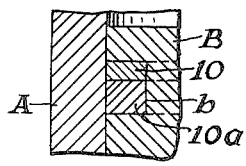
Figure 11:
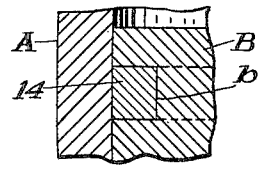
Figure 12:
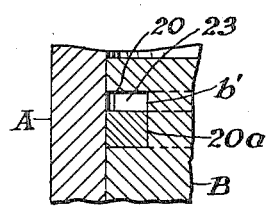
Figure 13:
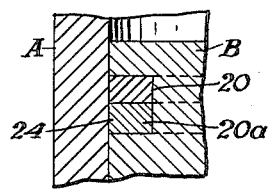
Figure 14:
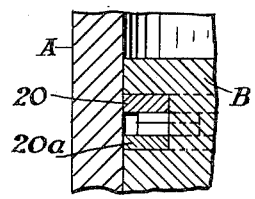

In the drawings, Fig. 1 is a plan of my two-part ring adapted for normal or fluid stopping use; Fig. 2 is a diametric section thereof, as indicated by the line 2—2 on Fig. 1 and showing the ring ready for radial contraction when mounted in the piston groove; Fig. 3 is a diametric cross section of two members of the ring in the act of being interlocked with each other; Fig. 4 is a development of either member of the ring, showing it in edge elevation and bottom plan; Fig. 5 is a plan showing the ring adapted as an oil ring; Fig. 6 is a cross section of such ring on the plane indicated by the line 6—6 on Fig. 5, showing the two-parts interlocked and ready for mounting; Fig. 7 is a diametric cross section of the oil ring, showing the parts in the act of being placed together; Fig. 8 is a development of either member of the oil ring, showing it in edge elevation and bottom plan; Fig. 9 is a perspective of either of the members of the ring shown in Figs. 1 to 4; Figs. 10 and 11 are cross sections on an enlarged scale of the first form of ring, as indicated by the correspondingly numbered lines on Fig. 1; Figs. 12, 13 and 14 are enlarged cross sections through the oil ring, as indicated by the correspondingly numbered lines on Fig. 5.

Referring first to the embodiment of Figs. 1 to 4 and 9 to 11, this ring has two identical members designated 10 and 10a. Each member is formed as a nearly complete annulus but with a gap 11. From the gap 11 each arm of the ring member becomes gradually thickened toward the intermediate region diametrically opposite the gap. In such intermediate region each arm of the ring is offset producing an abrupt upward shoulder 12 and a correspondingly abrupt downward shoulder 13. In other words, the ring is formed as a single integral member from one end of the gap to the other, but two arms of the ring flare so that each arm is thicker in a region diametrically opposite the gap and such thickened portions overlap each other. The height of either shoulder 12 or 13 is substantially the same as the thickness of either arm at the extreme end thereof, from which it results that when the two rings are interlocked and placed at the piston groove the upper face of the composite ring lies in a single plane and likewise the flat lower face lies in a single plane and these two planes are parallel.

Before the composite ring is mounted in the piston groove the two members flare slightly from their interlocking regions, as shown in Fig. 2. This is due to the fact that I manufacture each member with the top surface of the arm at one end thereof, as indicated at 15 in Fig. 9, in substantially the same plane with the bottom surface of the other open end 16, while when the two ring members are interlocked the ends 15 and 16 are spread into slightly different planes due to the fact that the shoulders 12 and 13 do not quite reach the center plane of the thick portion 14 of the ring.

The slight springing action of the ring members in interlocking them with each other, gives a tendency of the composite ring, when mounted in the piston groove, to spring back into the flared condition, and this is a factor tending to maintain the ring tight in the groove in an axial direction while allowing it to expand or contract radially.

Moreover the taper by which the ring thickens from the gap to the offset portion is on that face of the ring which coacts with the other ring member. The result is that, while the upper and under faces of the composite ring remain strictly parallel with each other when the ring is mounted, the ring expands longitudinally of the piston as the ring is put into place in the piston groove. I thus maintain a snug engagement of the ring with the wall of the groove, preventing a chattering when in use.

It follows from the peculiar construction of my two-part ring and the inclined engagement of the two parts, with provision for circumferential collapsing of the ring, as it is put in place, that the ring always maintains a fluid-tight engagement with the wall of the piston groove and likewise provides a continuous circumferential surface engaging the cylinder wall. At every point throughout the inner periphery of the cylinder the ring presents a solid portion engaging the cylinder wall. This solid portion for the most of the composite ring is composed of both members but in each of the interlocking regions the engagement may be merely by one of the ring members, there being a short arcuate gap between the shoulder on that member and the end of the other member.

It is to be understood that in mounting the ring in the piston groove it is spread as necessary and slid over the end of the piston and collapsed circumferentially as that portion of the piston is passed into the cylinder. This collapsing bring the extreme ends of the two arms practically into abutting engagement with the two shoulders on the other member thereof. In practice the actual abutment ordinarily takes place at only one shoulder and there is a slight gap between the other shoulder and the coacting end of the other ring member; or the total clearance space remaining when the ring is mounted, may be divided so that part comes between one shoulder at the end of the other ring and the other part between the other shoulder, and the end of such other ring. In any case, however, the total gap left is of very minor dimensions and irrespective thereof there is always a solid portion in one or the other ring member engaging the cylinder wall at such gap.

In Figs. 10 and 11, A indicates the cylinder wall and B the piston having the groove b. In the region of the ring between the two shoulders, as happens for instance at 11—11 in Fig. 1, the thickest portion 14 of the ring fills the up-and-down dimension of the groove, as shown in Fig. 11. Likewise at any intermediate region, as indicated by line 10—10 on Fig. 1, and as shown in Fig. 10, the two overlapping arms 10 and 10a of the composite ring fill the groove.

It is sometimes desirable to have the piston ring receive oil and distribute it along the wall of the cylinder as the piston operates. Thus the ring next the crank shaft may readily be of the oil-carrying variety, while the rings beyond that to make merely the fluid-tight connection of the cylinder wall may readily be of the form illustrated in Figs. 1 to 4.

For the oil ring, I prefer to form recesses in the tapered inner faces of the ring members, as illustrated in Figs. 5 to 8, and 12 to 14. In this case the two-ring members designated 20 and 20a have the same outer flat sides lying in a plane and the same inner tapered surfaces and the same offsets with shoulders, as heretofore described. However, in the inner face of each ring member I provide a number of recesses 21 extending across the member, the recesses being so located that when the members are mounted one on the other as already described, the recesses on the two members come opposite each other and the lands 22 between the recesses are opposite each other. These lands have the same inclined face engageable with each other as already described.

I have shown the recesses as having their ends converging inwardly and the lands as flaring inwardly as shown in Fig. 5, which has the advantage of increasing the arcuate length of the mouth of the recess for the entrapping of oil and bringing the ends of the recesses closer together adjacent the cylinder wall to cover such wall more thoroughly with oil.

When the two members of the oil ring are placed in interlocking relation, as shown in Fig. 7, and brought together in the closer relation of Fig. 6 and thereafter mounted in the groove, their taper resulting from the collapsing and their resilient tendency to spread causes a very snug engagement with the upper and under wall of the piston groove as already explained for the normal ring.

In Figs. 12 to 14, I have shown at $b^1$ a groove in the piston B for carrying the oil ring. The section of Fig. 12, being taken in the gap beyond the free end of the upper arm of the ring 20a shows merely the shoulder 23 of the ring 20 and the body portion of the ring 20a below it. Further around on the composite ring Fig. 13 shows portions of the ring members 20 and 20a sectioned through two mating lands 22 of the members. Fig. 14 shows portions of the two ring members 20 and 20a and two mating recesses 21 in the respective rings.

It will be seen that my oil ring has the same spreading features as my normal ring to maintain a snug engagement with the upper and under walls of the piston groove both by its spring action and by its inclined camming action and has a similar peripheral action on the cylinder. Every point of the cylinder wall, within the range of travel of the ring, is engaged by some portion of the composite ring and in most regions in two portions, thus a snug engagement is maintained with the wall and at the same time oil, splashed up from the crank case and adhering to the wall, is gradually picked up by the piston ring and distributed along the wall.

I claim:

1. A composite piston ring composed of two interlocking members each nearly completely annular but having a gap, each member extending through the other at the gap so that each member lies above the other in one region of the composite ring and below the other in the opposite region thereof, the adjacent surfaces of the two ring members being inclined in opposite directions.

2. A composite piston ring comprising two interlocking nearly annular members, each member having a pair of arcuate arms leading from an intermediate region having the full thickness of the composite ring to a gap between the ends of the arms substantially diametrically opposite said intermediate region, the said intermediate region of each member occupying the gap of the other member, the arms gradually increasing in thickness from the gap to the intermediate region, whereby the composite ring expands, axially when contracted radially.

3. A composite piston ring comprising two identical interlocking members, each member being nearly completely annular but having a gap, the intermediate portion of each member substantially diametrically opposite its gap extending through the gap of the other member, the surfaces on the underside of one member and the upper side of the other being inclined in opposite directions.

4. A composite piston ring composed of two identical incompletely annular members, each member having a gap and having the mid-region substantially diametrically opposite the gap extending through the gap to the other member so that substantially half of each member lies on top of the other member and substantially half below the other member, such coacting halves having their adjacent surfaces inclining in opposite directions, the upper and under surfaces of the composite ring being parallel when the composite ring is mounted.

5. A composite piston ring comprising two incompletely annular members each member occupying the gap of the other member and thus lying partly below and partly above it, each member having its free ends at opposite sides of its gap pressing under spring action against the other member, thus causing the portions of the two members intermediate of the two gaps to have a tendency to spread apart axially.

6. A composite piston ring composed of two identical incompletely annular members each member extending through the gap of the other member to lie partly above it and partly below it, each member having a spring action on the other member tending to spread them apart in the region between the two gaps.

7. A composite piston ring comprising two identical members, each nearly annular but having a gap in one region and substantially diametrically opposite the gap having upwardly and downwardly offset shoulders, the arms of each member becoming gradually thinner from the offset shoulder to the free end of the arm, the reduction in thickness taking place on that face of the member which engages the other member, whereby the composite ring has parallel top and bottom faces but inclined intermediate faces, the intermediate portion of each member where it extends through the gap of the other member having its shoulders standing opposite the end of the arm of the other member with an arcuate space of variable length between them, allowing the composite ring to be collapsed radially, such collapsing causing the ring to expand axially, the two free arms of each ring when unmounted having their respective top and bottom planes more nearly coincident than when mounted, whereby a spring action results tending to spread the portions of the composite ring intermediate of the two gaps.

8. A nearly annular piston ring member adapted to form part of a composite piston ring, said ring member having a gap in one portion and being of gradually increasing thickness in each arcuate direction from the gap, whereby when said ring member is interlocked with another member, each extending through the other at the gap, said ring members have an inclined arcuate engagement tending to expand the composite ring axially when contracted radially.

9. A nearly annular member for a composite piston ring, said member having a gap in one region and substantially diametrically opposite the gap having upper and lower shoulders, the ring diminishing in thickness gradually from each abrupt shoulder to the corresponding free end of the member, whereby each member may be interlocked with a similar member each having its shouldered portion extending through the gap of the other and the inclined surfaces of such two members being adapted to bear against each other while the external planes of the two members are parallel.

10. A composite piston ring adapted to entrain oil in a cylinder, the ring being composed of two members each nearly completely annular but with a gap therein, each member extending through the gap of the other to lie in one region above it and in another region below it, two members having mating recesses in their adjacent faces adapted to entrain oil, the two members having lands between the recesses with oppositely inclined faces so that when the composite ring is contracted radially it expands axially.

11. A composite piston ring adapted to entrain oil in a cylinder, the ring being composed of two identical members each nearly completely annular but with a gap therein, each member extending through the gap of the other to lie in one region above it and in another region below it, two members having mating recesses in their adjacent faces adapted to entrain oil, the two members having lands between the recesses with inclined faces so that when the composite ring is contracted radially it expands axially, the recesses flaring outwardly at their ends and lands between them flaring inwardly.

12. A member for a composite oil ring, said member being nearly completely annular but having a gap in one region, and having upward and downward shoulders in the region substantially diametrically opposite its gap, the arcuate arms extending from the shouldered region being recessed by openings extending across the arm whereby oil may be entrained in the composite ring, the lands between the recesses being inclined to effect an axial expansion of the composite ring.

13. A composite piston ring adapted to entrain oil in a cylinder, the ring being composed of two members each nearly completely annular but with a gap therein, each member extending through the gap of the other to lie in one region above it and in another region below it, said two members being substantially in contact in separated regions between the portions which extend through the gaps and the ends of the member, the spaces between said regions being open across the ring from the inner periphery to the outer periphery thereof.

AUGUST H. HEINRICH.

REFERENCES CITED

The following references are of record in the file of this patent:

UNITED STATES PATENTS

| Number | Name | Date |
|---|---|---|
| 1,126,898 | Sorenson | Feb. 2, 1915 |
| 1,152,002 | Bryant | Aug. 31, 1915 |
| 1,263,897 | Jaeger | Apr. 23, 1918 |
| 1,395,366 | Schreiber | Nov. 1, 1921 |
| 1,682,850 | Newton | Sept. 4, 1928 |

FOREIGN PATENTS

| Number | Country | Date |
|---|---|---|
| 195,820 | Great Britain | Apr. 12, 1923 |
| 335,534 | Germany | Apr. 6, 1921 |